(12) United States Patent
Filipenco et al.

(10) Patent No.: US 10,113,561 B2
(45) Date of Patent: Oct. 30, 2018

(54) SECONDARY FLOW BAFFLE FOR TURBOMACHINERY

(71) Applicant: United Technologies Corporation, Farmington, CT (US)

(72) Inventors: Victor G. Filipenco, Portland, CT (US); Jordan T. Wall, Hartford, CT (US)

(73) Assignee: PRATT & WHITNEY, East Hartford, CT (US)

( * ) Notice: Subject to any disclaimer, the term of this patent is extended or adjusted under 35 U.S.C. 154(b) by 379 days.

(21) Appl. No.: 15/153,578

(22) Filed: May 12, 2016

(65) Prior Publication Data

US 2017/0328378 A1    Nov. 16, 2017

(51) Int. Cl.
*F01D 25/12* (2006.01)
*F04D 29/54* (2006.01)
*F04D 29/32* (2006.01)
*F04D 29/52* (2006.01)
*F04D 29/58* (2006.01)
*F01D 5/08* (2006.01)
*F01D 9/04* (2006.01)
*F02K 3/06* (2006.01)
*F04D 27/02* (2006.01)

(52) U.S. Cl.
CPC .......... *F04D 29/542* (2013.01); *F01D 5/082* (2013.01); *F01D 9/041* (2013.01); *F02K 3/06* (2013.01); *F04D 27/0215* (2013.01); *F04D 29/325* (2013.01); *F04D 29/522* (2013.01); *F04D 29/582* (2013.01); *F04D 29/584* (2013.01); *F05D 2260/20* (2013.01); *F05D 2260/608* (2013.01)

(58) Field of Classification Search
CPC .......... F01D 5/082; F01D 5/087; F01D 5/088; F04D 29/541; F04D 29/584
See application file for complete search history.

(56) References Cited

U.S. PATENT DOCUMENTS

| 3,540,682 | A | * | 11/1970 | Howard | ................. F01D 5/022 244/53 R |
| 4,156,344 | A | * | 5/1979 | Cuthbertson | ........... F02C 7/045 415/119 |
| 5,211,533 | A | | 5/1993 | Walker | |
| 2007/0059169 | A1 | | 3/2007 | Barnett | |
| 2008/0014095 | A1 | | 1/2008 | Moniz | |
| 2013/0323038 | A1 | | 12/2013 | Feigleson | |

OTHER PUBLICATIONS

EP Search Report dated Sep. 29, 2017 in EP Application No. 17159720.6.

* cited by examiner

*Primary Examiner* — Ninh H Nguyen
(74) *Attorney, Agent, or Firm* — Snell & Wilmer L.L.P.

(57) ABSTRACT

A stage of a fan for a gas turbine engine may include a rotor blade and a stator vane disposed aft of the rotor blade. A baffle may be coupled to the stator vane. The baffle may define a secondary airflow path from aft of the stator vane to forward of the rotor blade. The baffle may further define the secondary airflow path from aft of the stator vane to forward of the stator vane.

20 Claims, 4 Drawing Sheets

SECONDARY FLOW BAFFLE FOR TURBOMACHINERY

GOVERNMENT LICENSE RIGHTS

This disclosure was made with government support under contract No. FA8650-09-D-2923 awarded by the United States Air Force. The government has certain rights in the disclosure.

FIELD

The present disclosure relates to gas turbine engines, and, more specifically, to a rotor-stator assembly.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads. Engine components may experience damage if exposed to hot gases.

SUMMARY

A stage of a fan for a gas turbine engine is described herein, in accordance with various embodiments. The stage of a fan may include a rotor blade and a stator vane disposed aft of the rotor blade. A baffle may be coupled to the stator vane. The baffle may define a secondary airflow path from aft of the stator vane to forward of the stator vane.

In various embodiments, the baffle may extend radially inward from the stator vane. The baffle may define the secondary airflow path in a radially inward direction from the stator vane. The baffle may include an annular shape. The stator vane may comprise an exit stator vane. In various embodiments, a disk may be coupled to the rotor blade. The baffle may define the secondary airflow path radially outward along a forward surface and an aft surface of the disk. In various embodiments, a rotor blade and a stator vane may comprise a fan stage.

A fan section of a gas turbine engine is also provided. The fan section may include a core airflow path and a stage. The stage may have a rotor blade and a stator vane disposed aft of the rotor blade. The stage may also have a baffle coupled to the stator vane. The baffle may define a secondary airflow path from the core airflow path aft of the stator vane to forward of the stator vane.

In various embodiments, the baffle may extend radially inward from the stator vane. The baffle may define the secondary airflow path in a radially inward direction from the stator vane. The baffle may include an annular shape. In various embodiments, a disk may be coupled to the rotor blade. The disk further defines the secondary airflow path from aft of the rotor blade to forward of the rotor blade. The baffle may define the secondary airflow path radially outward along a forward surface and an aft surface of the disk. In various embodiments, the fan section may include a bearing system. The baffle may be configured to couple to the bearing system. The stator vane may comprise an exit stage from the fan section for the core airflow path.

A gas turbine engine is also provided. The gas turbine engine may include a fan and a compressor. The fan may have a rotor blade and a stator vane disposed aft of the rotor blade. A core airflow path may be directed through the fan and compressor. A baffle may be coupled to the stator vane. The baffle may define a secondary airflow path from aft of the stator vane to forward of the stator vane.

In various embodiments, the disk may further define the secondary airflow path from aft of the rotor blade to forward of the rotor blade. A disk may be coupled to the rotor blade. The disk may define the secondary airflow path radially outward along a forward surface and an aft surface of the disk. The stator vane may comprise an exit stage from the fan for the core airflow path.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
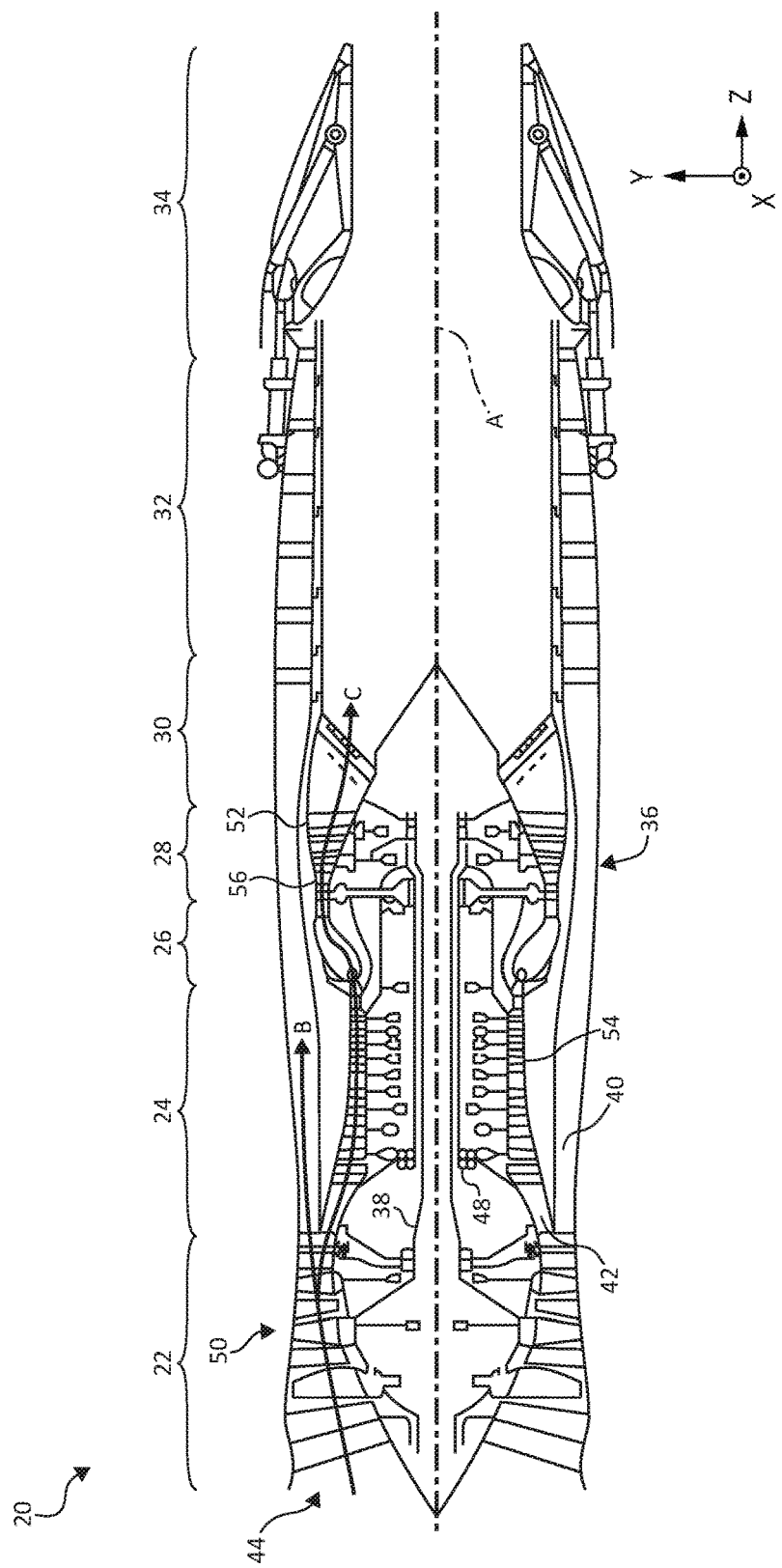
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may comprise a two-spool low-bypass augmented turbofan that may generally incorporate a fan section 22, a compressor section 24, a combustor section 26, a turbine section 28, an augmenter section 30, an exhaust duct section 32, and a nozzle system 34, along an engine central longitudinal axis A. Engine central longitudinal axis A is oriented in the z direction on the provided xyz axis. Although depicted as an augmented low-bypass turbofan in the non-limiting embodiment of FIG. 1, it should be understood that the concepts described herein are applicable to other gas turbine engines including non-augmented engines, geared architecture engines, direct drive turbofans, high-bypass turbofans, turbojets, turboshafts, multi-stream variable cycle adaptive engines, and other engine architectures. A gas turbine engine may comprise an industrial gas turbine (IGT) or a geared aircraft engine, such as a geared turbofan, or non-geared aircraft engine, such as a turbofan, or may comprise any gas turbine engine as desired.

An engine case structure 36 may define a generally annular bypass airflow path 40 around a core airflow path 42. Engine case structure 36 may include an inner engine case structure 38. Various case structures and modules may define the engine case structure 36 which defines an exoskeleton to support the rotational hardware. Along core airflow path 42, air is drawn through intake 44 at a forward end of gas turbine engine 20. Air may enter a fan 50 and may be divided between a core airflow C, which flows through core airflow path 42, and a bypass airflow B, which flows through bypass airflow path 40. Compressor section 24 may be located downstream of fan section 22. Core airflow C passes through compressor section 24, combustor section 26, turbine section 28, and augmentor section 30 where fuel may be selectively injected and burned to generate additional thrust through the nozzle system 34. Bypass airflow B may be utilized for multiple purposes including, for example, cooling and pressurization. Bypass airflow B may ultimately be at least partially injected into core airflow path 42 adjacent to exhaust duct section 32 and nozzle system 34. It should be appreciated that additional air flow streams such as a third stream air flow typical of variable cycle engine architectures may additionally be sourced from the fan section 22. Additionally, the discussion of flowpaths and airflows is not exhaustive and the typical engine will include further branching and diversions for various purposes such as cooling, heating, process dilution, and the like.

Gas turbine engine 20 may generally comprise a low speed spool and a high speed spool mounted concentrically via bearing systems 48 for rotation about engine central longitudinal axis A relative to engine case structure 36. It should be understood that various bearing systems 48 at various locations may alternatively or additionally be provided. In various embodiments, fan section 22, compressor section 24, and turbine section 28 may include a rotor-stator assembly comprising one or more stages or sets of rotating blades ("rotor blades") and one or more stages or sets of stationary vanes ("stator vanes") axially interspersed with the associated blade stages but non-rotating about engine central longitudinal axis A. Unless otherwise indicated, the term "stage" may refer to a fan stage, a compressor stage, and/or a turbine stage. The blade stages of a fan 50 and a low pressure turbine 52 may at least partially form a low pressure spool. Similarly, the blade stages of a high pressure compressor 54 and high pressure turbine 56 may at least partially form a high speed spool. Alternative implementations may include a low pressure compressor driven by low pressure turbine as part of the low speed spool. As used herein, a "high pressure" compressor or turbine experiences a higher pressure than a corresponding "low pressure" compressor or turbine.

An augmenter section 30 may reside aft of the turbine section 28 and may be available to provide additional power. Augmenter section 30 may be positioned forward of exhaust duct section 32 of gas turbine engine 20 to receive the hot gases of combustion as they exit turbine section 28. At the aft of exhaust duct section 32 is a nozzle system 34, which may be a convergent-divergent (C-D) nozzle. Hot gases passing through nozzle system 34 may provide thrust to move the aircraft forward.

Figure 2:
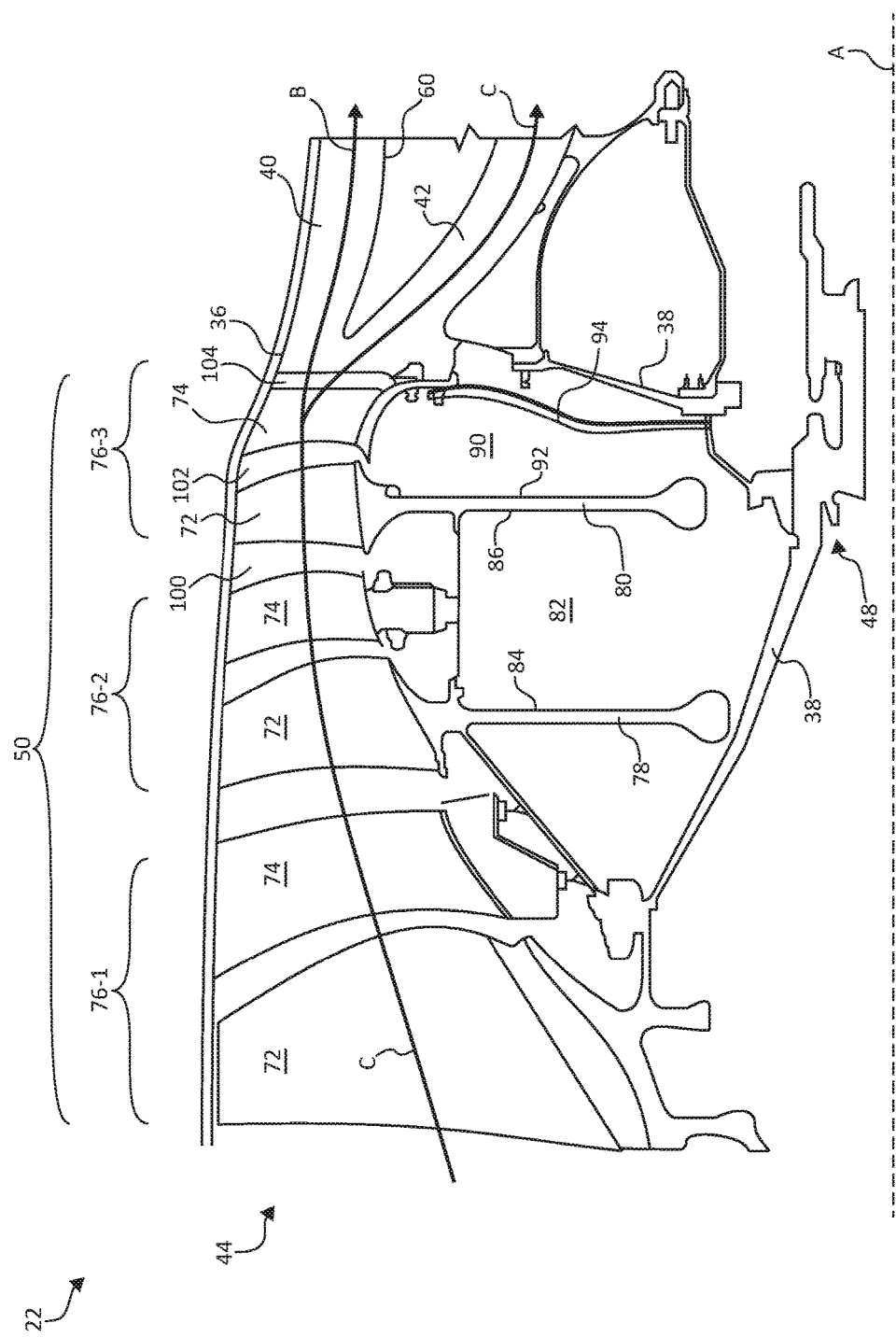
FIG. 2 illustrates a plurality of exemplary airfoils, such as a rotor blade and a stator vane of an exemplary gas turbine engine, in accordance with various embodiments.

With reference to FIG. 2, a fan section 22 is shown, in accordance with various embodiments. With general reference to FIGS. 1 and 2, air is drawn into gas turbine engine 20 through fan 50 at intake 44. Core airflow C passes from intake 44 through fan 50. Downstream of fan 50, core airflow C may be split between a bypass airflow path 40 and core airflow path 42, with core airflow C being channeled to compressor section 24 and bypass airflow B being channeled to a bypass duct 60.

In various embodiments and with reference to FIG. 2, fan 50 may comprise a multi-stage fan including multiple sets or couplets of rotor blades 72 and stator vanes 74 that extend into core airflow C. Stator vanes 74 may be arranged circumferentially about engine central longitudinal axis A. Rotor blades 72 may rotate about engine central longitudinal axis A, while stator vanes 74 may remain stationary about engine central longitudinal axis A. Further, in various embodiments, a set of rotor blades 72 may be coupled about a circumference of a generally circular central disk 78 or 80. Disks 78, 80 may be disposed radially inward of core airflow C and adjacent to portions of bearing system 48 and an inner engine case structure 38. Rotor blades 72 may rotate with disks 78, 80 about bearing system 48. Disk 78 and disk 80 may define a first disk cavity 82 therebetween as a space or chamber defined by an aft surface 84 of disk 78 and a forward surface 86 of disk 80. Thus, first disk cavity 82 may be disposed forward of disk 80, while a second disk cavity 90 may be disposed aft of disk 80. Second disk cavity 90 may be defined partially by an aft surface 92 of disk 80. A baffle 94, as discussed herein, may further define second disk cavity 90. In various embodiments, baffle 94 may direct a portion of a secondary airflow within fan 50. Secondary airflow may include any airflow different from core airflow C and may include airflow leakage, purge airflow, or conditioning airflow.

Each couplet of rotor blades 72 and stator vanes 74 may comprise a stage 76 of fan 50. As depicted in FIG. 2, fan 50 may have three stages 76-1, 76-2, and 76-3 although it will be understood that fan 50 may include greater than or fewer than three stages. Stage 76-1 may operate as a first stage of fan 50, stage 76-2 may operate as a second stage of fan 50, and stage 76-3 may operate as a third stage or exit stage of fan 50. Stage 76-2 may be located aft of stage 76-1, and stage 76-3 may be located aft of stage 76-2.

Stator vanes 74, among other stationary components, may be configured to guide and/or adjust core airflow C between adjacent rotor blades 72 within their respective engine section. In various embodiments, stator vanes 74 may increase pressure in fan 50, and straighten and direct air flow. The pressure and temperature of core airflow C passing through fan 50 may progressively increase as each stage 76 adds energy to core airflow C. Thus, core airflow C may be higher in pressure and temperature at a location downstream of stage 76-2 than at a location forward or upstream of stage 76-2. Similarly, core airflow C may be higher in pressure and temperature at a location downstream of stage 76-3 than at a location forward or upstream of stage 76-3.

The thermal environment surrounding each stage 76 may vary during operation of fan 50. It may be desirable to regulate the operating temperature of certain fan components in order to prevent overheating and potential mechanical failures attributable thereto. For example, a temperature gradient extending radially thorough disks 78 may cause thermal stress in disks 78. Thermal conditioning may be provided for fan components and cavities to maintain an operating temperature of the components of fan 50. A portion of core airflow C may be purged or extracted from core airflow C to extract heat from portions of the gas turbine engine to maintain desired operating temperatures of engine components. A portion of the purged air from core airflow C may be directed radially inward from rotor blades 72 and stator vanes 74 and as conditioning or cooling air for the conditioning of disks 78, 80 and disk cavities 82, 90. In various embodiments, a baffle 94 may direct purged air extracted from core airflow C.

In various embodiments, associated rotor blades 72 and stator vanes 74, such as stages 76-1, 76-2, and 76-3, may define flow cavities, such as flow cavities 100, 102, and 104. Flow cavity 102 may be located downstream of flow cavity 100, and flow cavity 104 may be located downstream of flow cavity 102. For example, a flow cavity 100 located between stage 76-2 and stage 76-3 may be defined by stator vane 74 of stage 76-2 and rotor blade 72 of stage 76-3. Flow cavity 100 may be disposed aft of stage 76-2 and forward of stage 76-3. A flow cavity 104 located aft of stage 76-3 may be defined by stator vane 74 of stage 76-3 and a portion of engine case structure 36. Additionally, a flow cavity, such as flow cavity 102, may be defined within a stage 76 between a stator vane 74 and rotor blade 72 of the same stage. For example, flow cavity 102 located at a half stage of stage 76-3 may be defined by rotor blade 72 and stator vane 74 of stage 76-3. Flow cavity 102 may be disposed aft of rotor blade 72 of stage 76-3 and forward of stator vane 74 of stage 76-3.

Figure 3:
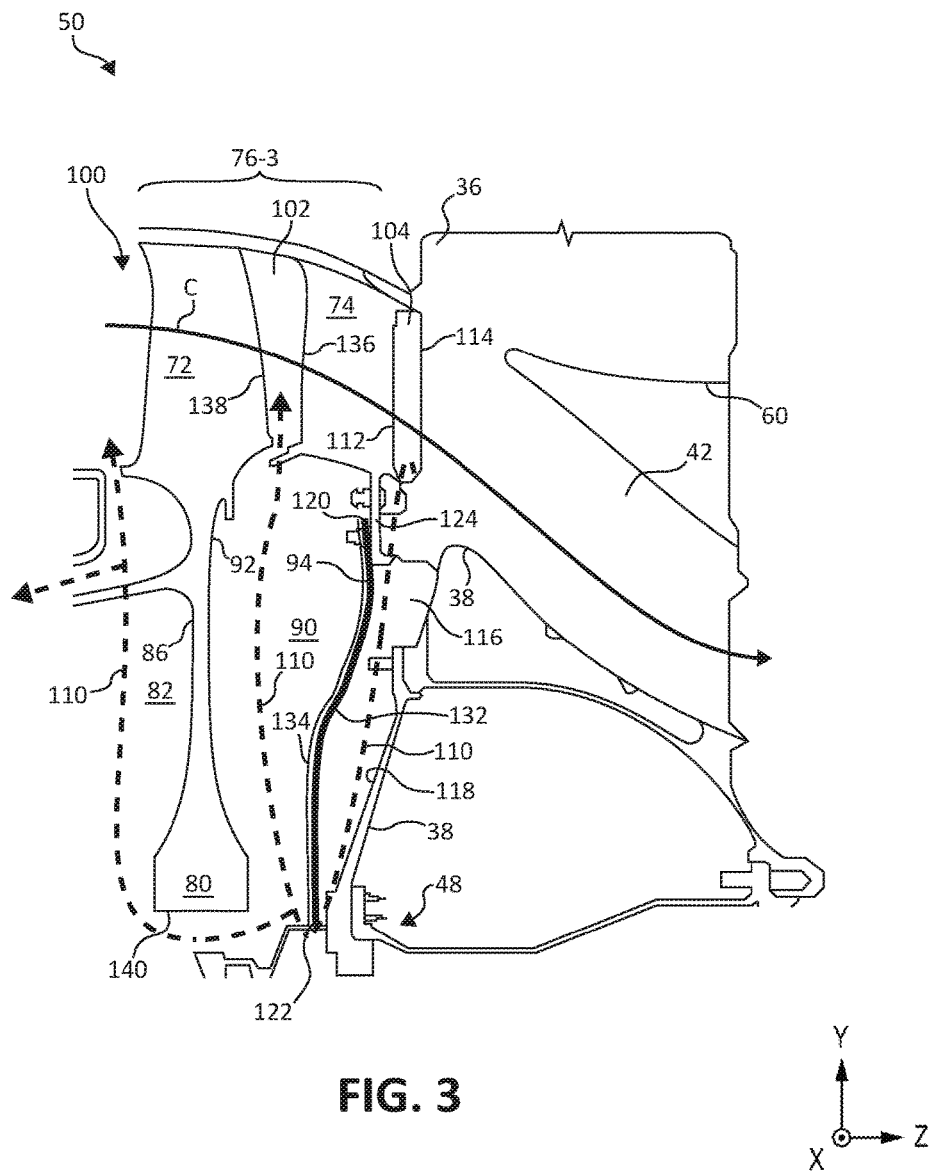
FIG. 3 illustrates a cross-sectional view of a rotor-stator assembly with a baffle for directing secondary flow, in accordance with various embodiments.

With reference to FIG. 3, stage 76-3 of fan 50 is shown in accordance with various embodiments. In various embodiments, a portion of core airflow C is extracted from flow cavity 104. The purge air may be provided as a conditioning or cooling air to components of fan 50 that experience high temperatures during operation to dissipate heat. The purged air may be directed radially inward toward the rotational axis A of fan 50, shown as secondary airflow path 110. Baffle 94 directs secondary airflow path 110, which flows radially inward from flow cavity 104 and is routed to disk cavities 82, 90 to assist in maintaining a normal steady state temperature of the components surrounding disk cavities 82, 90. For example, secondary airflow path 110 may be directed around one or more of disks 78, 80. In various embodiments, a secondary airflow path 110 may be directed, in part by baffle 94, to reduce the temperature rise within second disk cavity 90 and to thermally condition or cool disk 80.

In various embodiments, secondary airflow path 110 may be extracted from core airflow C aft of a fan exit stage, such as aft of stage 76-3, from flow cavity 104. Flow cavity 104 may be defined by an aft surface 112 of stator vane 74 of stage 76-3 and by a forward surface 114 of engine case structure 36. Core airflow C within flow cavity 104 aft of stator vane 74 may have a pressure greater than core airflow C within flow cavity 102 forward of stator vane 74. A pressure difference between flow cavity 104 and flow cavity 100 may be greater than a pressure difference between flow cavity 102 and flow cavity 100. The pressure difference between flow cavity 104 and flow cavity 100 may be high enough to provide adequate purge airflow during low pressure engine operating conditions. Flow cavity 104 as the source for secondary airflow path 110 may provide sufficient airflow (i.e., airflow with sufficient pressure) over a wide range of operating conditions.

Secondary airflow path 110 illustrated in FIG. 3, may include portions flowing in a direction at least partially forward or upstream from stator vane 74 of stage 76-3. The forward direction may be referred to as a negative z direction. Secondary airflow path 110 may generally be directed from flow cavity 104, around baffle 94, and into flow cavity 102 and flow cavity 100. Baffle 94 may be located radially inward of stator vane 74 of stage 76-3 between flow cavity 104 and flow cavity 102. Baffle 94 may define a cavity 116 aft of baffle 94 and aft of second disk cavity 90. Secondary airflow path 110 may be directed around baffle 94 in the negative z direction from flow cavity 104 aft of baffle 94 to forward of baffle 94. Secondary airflow path 110 may be directed radially inward from flow cavity 104 and may be directed proximally along a forward surface 118 of inner engine case structure 38. Cavity 116 may be defined by forward surface 118 of inner engine case structure 38 and an aft surface 132 of baffle 94. Secondary airflow path 110 may be directed through cavity 116 between baffle 94 and inner engine case structure 38 radially inward toward bearing system 48.

Baffle 94 may comprise an outer edge 120 and an inner edge 122. Baffle 94 may be coupled to a proximal portion of stator vane 74 at outer edge 120 of baffle 94. Baffle 94 may be coupled to a flange 124 of stator vane 74 by a fastener, such as a rivet, bolt, or other suitable retention mechanism. Flange 124 may extend radially inward from stator vane 74, such as from aft surface 112 of stator vane 74. Baffle 94 may extend radially inward from stator vane 74 to bearing system 48. Baffle 94 may curve or slant generally forward from outer edge 120 toward inner edge 122, such that inner edge 122 may be located forward of outer edge 120 and further such that inner edge 122 may be located forward of aft surface 112 of stator vane 74. Baffle 94 may be coupled to a portion of bearing system 48, inner engine case structure 38, or other engine component at inner edge 122 of baffle 94.

In various embodiments, secondary airflow path 110 may be directed radially inward along an aft surface 132 of baffle 94, forward over inner edge 122 through aperture 130 in baffle 94, and radially outward along a forward surface 134 of baffle 94. Inner edge 122 of baffle 94 may define an aperture 130 located radially inward of inner edge 122 (see FIG. 4), which permits secondary airflow path 110 over inner edge 122 and through aperture 130. Secondary airflow path 110 through aperture 130 may be defined by inner edge 122 of baffle 94 and a portion of bearing system 48, inner engine case structure 38, or other engine component. Thereafter, secondary airflow path 110 may be directed radially outward through second disk cavity 90 into flow cavity 102, between aft surface 138 of rotor blade 72 and forward surface 136 of stator vane 74, and thus into core airflow C. Second disk cavity 90 may be defined by forward surface 134 of baffle 94 and aft surface 92 of disk 80. Secondary airflow path 110 is directed radially outward from second disk cavity 90 to flow cavity 102.

In various embodiments, secondary airflow path 110 may be directed upstream or forward over a radially inner edge 140 of disk 80. Secondary airflow path 110 may further be defined by radially inner edge 140 of disk 80 and a portion of bearing system 48, inner engine case structure 38, or other engine component. Secondary airflow path 110 may be directed radially outward through first disk cavity 82 into flow cavity 100, forward of rotor blade 72 of stage 76-3, and thus into core airflow C. Secondary airflow path 110 may be defined by forward surface 86 of disk 80 and a disk of a stage forward of stage 76-3. Thus, secondary airflow path 110 may be sourced a full stage downstream from cavity 100, by extracting air from core airflow C from flow cavity 104, which may be downstream from stage 76-3. Secondary airflow path 110 may be directed by baffle 94 radially inward toward bearing system 48 and upstream toward disk 80. Thereafter, secondary airflow path 110 may flow radially outward over both forward surface 86 and aft surface 92 of disk 80.

By flowing through second disk cavity 90 over aft surface 92 of disk 80 and though first disk cavity 82 over forward surface 86 of disk 80, secondary airflow path 110 may thermally condition disk 80 and may cool bearing system 48. Baffle 94 may direct a secondary airflow path 110 and thereby reduce a temperature of secondary airflow path 110 by preventing undesirable secondary airflow paths. For example, baffle 94 may prevent secondary airflow path 110 from circulating around stator vane 74 and within second disk cavity 90 and from increasing the temperature of secondary airflow path 110 and engine components, such as disk 80 and bearing system 48.

Figure 4:
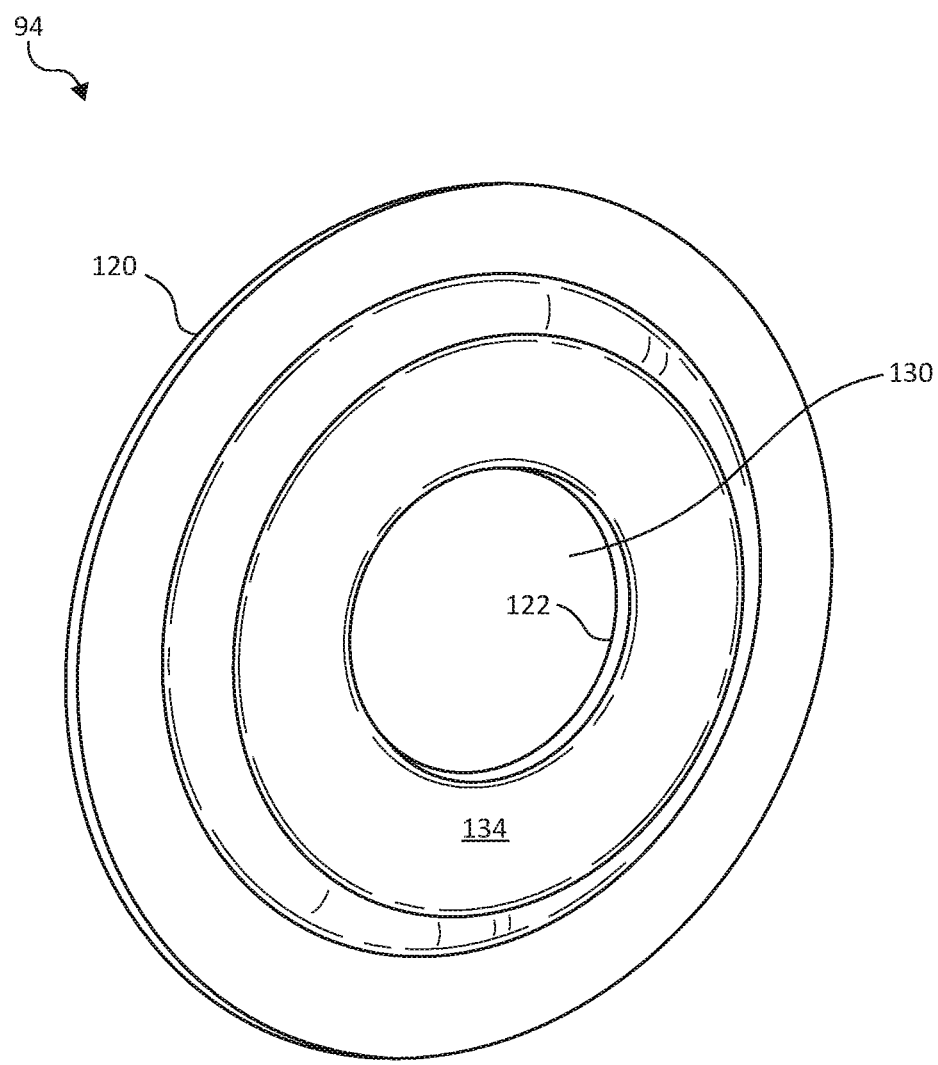
FIG. 4 illustrates a perspective view of a baffle for directing secondary flow, in accordance with various embodiments.

With reference to FIG. 4, baffle 94 is shown in accordance with various embodiments. In various embodiments, baffle 94 may be circumferentially continuous (e.g., annular or ring shaped). Baffle 94 may comprise a relatively linear cross-sectional profile as well as a variety of curved or curving cross-sectional profiles, for example, curving into or out of the xy plane. Baffle 94 may further comprise an angled or slanted geometry, such as a frustoconical shape. In various embodiments, baffle 94 may be manufactured using forging, casting, additive manufacturing, machining or the like. In various embodiments, baffle 94 may include a metal, such as titanium, titanium-based alloy, nickel, nickel-based alloy, for example, austenitic nickel-chromium-based alloy such as INCONEL™ (which is available from Special Metals Corporation of New Hartford, N.Y., USA) aluminum, aluminum-based alloy, steel, or stainless steel, or other materials such as composites, polymers, epoxy, carbon fiber, or any material or combination of materials having desired material properties, such as heat tolerance, strength, stiffness, weight, or density.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stage of a fan for a gas turbine engine, comprising:
a rotor blade;
a stator vane disposed aft of the rotor blade; and
a baffle extending radially inward from the stator vane, the baffle defining a secondary airflow path from a higher pressure zone aft of the stator vane to a lower pressure zone forward of the stator vane,
wherein the secondary airflow path is disposed between a forward surface of an inner case structure and an aft surface of the baffle, between a forward surface of the baffle and an aft surface of a disk, and forward of a forward surface of the disk, and wherein the baffle has at least one of a curve or slant defining a cavity configured to direct airflow around the baffle and to disk cavities.

2. The stage of claim 1, wherein the baffle extends radially inward from the stator vane.

3. The stage of claim 2, wherein the baffle defines the secondary airflow path in a radially inward direction from the stator vane.

4. The stage of claim 3, wherein the stator vane comprises an exit stator vane.

5. The stage of claim 4, wherein the baffle includes an annular shape.

6. The stage of claim 1, further comprising the disk coupled to the rotor blade, the baffle defining the secondary airflow path extending radially outward along the forward surface and the aft surface of the disk.

7. The stage of claim 1, wherein the rotor blade and the stator vane comprise a fan stage.

8. A fan section of a gas turbine engine, comprising:
a core airflow path; and
a stage, comprising:
a rotor blade,
a stator vane disposed aft of the rotor blade, and
a baffle extending radially inward from the stator vane, the baffle defining a secondary airflow path from the core airflow path aft of the stator vane to a lower pressure zone forward of the stator vane;
wherein the secondary airflow path is disposed between a forward surface of an inner case structure and an aft surface of the baffle, between a forward surface of the baffle and an aft surface of a disk, and forward of a forward surface of the disk, and
wherein the baffle has at least one of a curve or slant defining a cavity configured to direct airflow around the baffle and to disk cavities.

9. The fan section of claim 8, wherein the baffle extends radially inward from the stator vane.

10. The fan section of claim 9, wherein the baffle defines the secondary airflow path in a radially inward direction from the stator vane.

11. The fan section of claim 10, wherein the baffle includes an annular shape.

12. The fan section of claim 8, further comprising the disk coupled to the rotor blade.

13. The fan section of claim 8, wherein the disk further defines the secondary airflow path from aft of the rotor blade to forward of the rotor blade.

14. The fan section of claim 8, wherein the disk further defines the secondary airflow path radially outward along the forward surface and the aft surface of the disk.

15. The fan section of claim 8, further comprising a bearing system, the baffle configured to couple to the bearing system.

16. The fan section of claim 8, wherein the stator vane comprises an exit stage from the fan section for the core airflow path.

17. A gas turbine engine, comprising:
a fan including:
a rotor blade, and
a stator vane disposed aft of the rotor blade;
a compressor;
a core airflow path directed through the fan and the compressor; and
a baffle extending radially inward from the stator vane, the baffle defining a secondary airflow path from a higher pressure zone aft of the stator vane to a lower pressure zone forward of the stator vane;
wherein the secondary airflow path is disposed between a forward surface of an inner case structure and an aft surface of the baffle, between a forward surface of the baffle and an aft surface of a disk, and forward of a forward surface of the disk, and
wherein the baffle has at least one of a curve or slant defining a cavity configured to direct airflow around the baffle and to disk cavities.

18. The gas turbine engine of claim 17, further comprising the disk coupled to the rotor blade, the disk defining the secondary airflow path radially outward along the forward surface and the aft surface of the disk.

19. The gas turbine engine of claim 18, wherein the disk further defines the secondary airflow path from aft of the rotor blade to forward of the rotor blade.

20. The gas turbine engine of claim 19, wherein the stator vane comprises an exit stage from the fan for the core airflow path.

* * * * *